United States Patent [19]

Vyas

[11] Patent Number: 4,671,905
[45] Date of Patent: Jun. 9, 1987

[54] METHOD OF A FORMING A SECONDARY COATING ON AN OPTICAL FIBER

[75] Inventor: Mahesh K. R. Vyas, Harlow, England

[73] Assignee: International Standard Electric Corporation, New York, N.Y.

[21] Appl. No.: 729,590

[22] Filed: May 2, 1985

[30] Foreign Application Priority Data

May 3, 1984 [GB] United Kingdom ............... 8411320

[51] Int. Cl.⁴ ............................................. B29D 11/00
[52] U.S. Cl. ..................................... 264/1.5; 264/174; 264/235; 350/96.34
[58] Field of Search ................ 264/1.5, 171, 174, 346, 264/235; 350/96.30, 96.29, 96.34, 96.33; 65/3.4; 427/163, 164, 165, 374.3

[56] References Cited

U.S. PATENT DOCUMENTS

| | | | |
|---|---|---|---|
| 3,960,530 | 6/1976 | Iyengar | 65/3.4 |
| 4,069,286 | 1/1978 | Greenhalgh | 264/85 |
| 4,116,654 | 9/1978 | Trehu | 65/3.11 |
| 4,161,500 | 7/1979 | Schleinitz | 264/1.5 |
| 4,388,093 | 6/1983 | Kimura et al. | 65/3.11 |
| 4,541,979 | 9/1985 | Cooke et al. | 264/174 |

Primary Examiner—James Lowe
Attorney, Agent, or Firm—Lee, Smith & Zickert

[57] ABSTRACT

A stable secondary coating, for example of nylon, is applied to a primary coated optical fiber by a process including high-speed (≧100 meters per minute) extrusion of the secondary coating material, cooling of the extruded material by quenching in cold water at a position up to four meters from the extruder crosshead, and subsequent annealing to increase the density of the extruded and quenched material.

7 Claims, 1 Drawing Figure

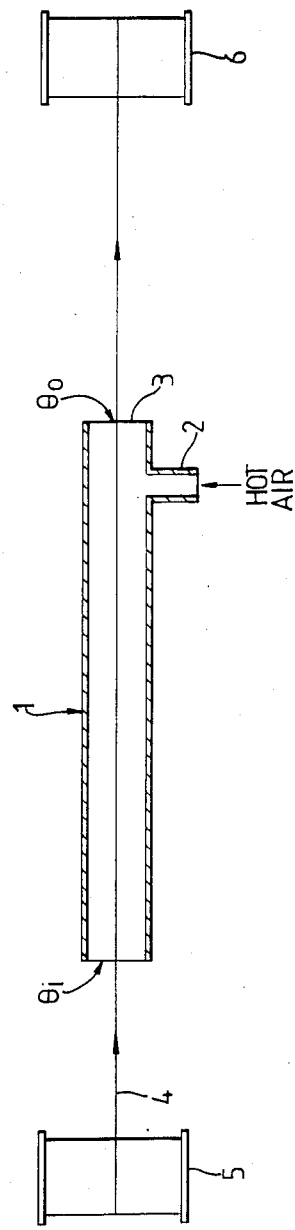

METHOD OF A FORMING A SECONDARY COATING ON AN OPTICAL FIBER

FIELD TO WHICH THE INVENTION PERTAINS

This invention relates to optical fibers and in particular to methods of applying secondary coatings thereto.

PRIOR ART

Immediately after drawing, optical fibers are provided with a primary coating of, for example, a silicone resin and subsequently, either on-line with that primary coating process or separately therefrom, a secondary coating of, for example, nylon is extruded over the primary coating.

Conventionally, the primary coated fibers are secondary coated to 1 mm outside diameter using a line speed of 40 m/min. There is a need to go to higher line speeds, for example 100 m/min or greater, in order to increase the volume of production and at the same time keep overall costs down. This is difficult to achieve when stable coatings are a primary requisite and secondary coatings for optical fibres are required to be stable with time and temperature.

SUMMARY OF THE INVENTION

According to the present invention there is provided a method of applying a coating to an optical fiber including the steps of extruding coating material onto the fiber, cooling the extruded material by quenching and annealing the cooled extruded material.

EMBODIMENTS

Embodiments of the invention will now be described with reference to the accompanying drawing which shows, schematically, an annealing process.

We have found that for a nylon coating to be stable with time and temperature, it must have a high crystallinity and a high density. This is achieved at the conventional 40 m/min extrusion speed simply by air cooling, an air path of some 5 meters being required. However, to achieve the same at very high extrusion speeds ($\geq 100$ m/min) very much greater unsupported lengths of secondary coated fiber would be necessary, and thus such air-cooling is impractical at high speeds.

We have also found that if an extruded nylon secondary coating on an optical fiber is quenched in cold water at a point to 4 meters from the extruder crosshead, then a transparent amorphous coating is obtained which has a density of approximately 1006 kg/m$^3$. The conventional air-cooled 40 m/min process with a 5 meter air path gives an opaque coating having a density of approximately 1015 kg/m$^3$. If recrystallisation of a transparent coating can be forced by an annealing process then its density can be increased.

In order to achieve a stable nylon secondary coating at higher than conventional coating speeds it is thus proposed to employ a two-stage process, in a first stage of which the primary coated fibre is secondary coated at high speed using a cold water quench up to some 4 meters from the crosshead and in a second stage of which the secondary coated fiber is annealed to force recrystallisation and thus increase the coating density. The annealing stage may be carried out on-line with the extrusion stage, although it is preferable to carry it out off-line, since several such fibers may be annealed simultaneously, thereby increasing production efficiency.

To demonstrate the feasibility of the above two-stage approach, a single mode fiber (primary coated) was coated at 100 m/min to 1 mm outside diameter using a 15° C. chilled water quench at 4 meters from the extruder head. The thus secondary coated fiber was then annealed at 5 m/min using an annealing tube 1 which is only shown schematically in the drawing. The tube was 3 meters long and had an inlet 2 for hot air towards one end 3 thereof. The one end 3 comprises the fiber outlet end. A secondary coated fiber 4 was paid off from a bobbin 5, passed through the tube 1 at 5 m/min whilst hot air was directed thereinto and reeled up on a take-up bobbin 6. It was found that depending on the inlet and outlet temperatures of the heating tube ($\sigma_i$ and $\sigma_o$, $\sigma_o > \sigma_i$), the opacity of the coating could be changed. Density measurements were carried out on the coatings obtained for different inlet/outlet conditions and the results obtained for nylon 12 are quoted in the following table I.

TABLE I

| $\sigma_i$ °C. | $\sigma_o$ °C. | Coating Density reg/m$^3$ |
|---|---|---|
| 120 | 140–145 | 1019.5 |
| 115 | 155 | 1022 |
| 115 | 160 | 1024.7 |
| 119 | 175 | 1026.3 |
| 139.5 | 180 | 1025.3 |

It was observed that the transparent water-quenched nylon 12 coating changed texture as a result of annealing, and that the opacity increased for increasing annealing temperatures using a fixed annealing speed of 5 m/min. The most opaque coating obtained as a result of annealing was still semi-transparent (semicrystalline) in comparison with the opaque coating applied by the conventional air-cooled coating process at 40 m/min.

The above results indicate the feasibility of the two stage process. In production, for example, individual fibers can be secondary coated by extrusion simultaneously at high speed and water quenched. Then a number of these fibers, up to 20 or more fibers, may be annealed off-line simultaneously, albeit at a low annealing line speed, thereby not reducing production efficiency. Whereas an annealing speed of 5 m/min is referred to above this is not to be considered as an upper, or lower, limit thereto. Higher annealing speeds can be employed with corresponding increase in length of the annealing tube, and without adversely affecting the secondary coating's properties. Whereas an extrusion speed of 100 m/min was employed in the above, even higher extrusion speeds of 200 or 300 m/min may be employed if followed by a water quenching/annealing process as described above to achieve the required stability of the finished coating.

Whereas the method has been specifically described with respect to secondary coatings of nylon, it is equally applicable to any other semicrystalline extrudable polymers, for example, HYTREL, polypropylene, polyethylene, polybutylene terepthalate.

TECHNICAL ADVANTAGES OF THE INVENTION

The method of the invention results in secondary coatings which are stable with temperature and time but which are produced by coating at higher line speeds than previously, thus increasing the volume of production whilst minimising production costs.

I claim:

1. A method of forming a secondary coating on the primary coating of an optical fiber, the method comprising:

extruding a semicrystalline extrudable polymer coating onto the primary coating of the optical fiber while the optical fiber is being fed through and extruder crosshead at a speed of at least about one hundred meters per minute; quenching the extruded polymer coating to provide an amorphous coating on the primary coating having a density of at least about 1006 kg/m$^3$ and annealing the amorphous coating at a temperature sufficient to recrystallize it and increase its density to at least about 1015 kg/m3

2. A method as claimed in claim 1, wherein said polymer comprises polyethylene, polypropylene, or polybutylene terepthalate.

3. A method as claimed in claim 1 wherein said coating is of nylon.

4. A method as claimed in claim 1, wherein cold water quenching is carried out at a distance up to four meters from the extruder crosshead.

5. A method as claimed in claim 1, wherein said annealing step comprises passing the cooled optical fiber through a tube from a first end to a second end thereof, which tube is heated by the direction of hot air thereinto such that the first end of the tube is at a lower temperature than the second end.

6. A method as claimed in claim 5 wherein the temperature at the first end of the tube is in the range 115° to 140° C. and the temperature at the second end of the tube is in the range of 140° to 180° C., the tube is of the order of three meters long and the optical fiber is fed therethrough at a speed of the order of five meters per minute.

7. A method as claimed in claim 1, wherein one or more individual optical fibers are coated by extrusion and quenching and a number of such coated fibers are annealed simultaneously.

* * * * *